(12) United States Patent
Reinauer

(10) Patent No.: US 9,064,118 B1
(45) Date of Patent: Jun. 23, 2015

(54) INDICATING WHETHER A SYSTEM HAS BOOTED UP FROM AN UNTRUSTED IMAGE

(71) Applicant: Google Inc., Mountain View, CA (US)

(72) Inventor: Stefan Reinauer, Mountain View, CA (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 13/743,289

(22) Filed: Jan. 16, 2013

Related U.S. Application Data

(60) Provisional application No. 61/612,187, filed on Mar. 16, 2012.

(51) Int. Cl.
*G06F 21/57* (2013.01)
*H04L 29/06* (2006.01)

(52) U.S. Cl.
CPC ............ *G06F 21/575* (2013.01); *H04L 63/126* (2013.01)

(58) Field of Classification Search
None
See application file for complete search history.

(56) References Cited

U.S. PATENT DOCUMENTS

| | | | | |
|---|---|---|---|---|
| 5,867,655 | A * | 2/1999 | DeRoo et al. | 709/213 |
| 6,775,778 | B1 * | 8/2004 | Laczko et al. | 713/194 |
| 7,596,692 | B2 * | 9/2009 | Fox et al. | 713/155 |
| 7,685,390 | B2 * | 3/2010 | Fujita et al. | 711/163 |
| 2003/0188176 | A1 * | 10/2003 | Abbondanzio et al. | 713/191 |
| 2005/0138409 | A1 * | 6/2005 | Sheriff et al. | 713/200 |
| 2005/0273603 | A1 * | 12/2005 | Girard | 713/164 |
| 2006/0026429 | A1 * | 2/2006 | Kudo et al. | 713/173 |
| 2006/0156008 | A1 * | 7/2006 | Frank | 713/176 |
| 2006/0244596 | A1 * | 11/2006 | Larson et al. | 340/572.1 |
| 2008/0046548 | A1 * | 2/2008 | Doran et al. | 709/222 |
| 2008/0077801 | A1 * | 3/2008 | Ekberg | 713/187 |
| 2009/0259833 | A1 * | 10/2009 | Mohrmann et al. | 713/1 |
| 2011/0087872 | A1 | 4/2011 | Shah et al. | |
| 2011/0161648 | A1 * | 6/2011 | Ekberg et al. | 713/2 |
| 2012/0079259 | A1 * | 3/2012 | Swanson et al. | 713/2 |
| 2012/0210115 | A1 * | 8/2012 | Park et al. | 713/2 |
| 2013/0173898 | A1 * | 7/2013 | Berg et al. | 713/2 |
| 2013/0179669 | A1 * | 7/2013 | Song et al. | 713/2 |
| 2013/0218915 | A1 * | 8/2013 | Billau et al. | 707/755 |
| 2014/0047243 | A1 * | 2/2014 | Lo et al. | 713/189 |

* cited by examiner

*Primary Examiner* — Michael R Vaughan
(74) *Attorney, Agent, or Firm* — McDermott Will & Emery LLP

(57) ABSTRACT

Systems, methods, and machine-readable media for indicating that a system has booted an untrusted image are provided. The system may be configured to receive instructions to boot up an image and determine whether the image to be booted up is untrusted. If the image is untrusted, the system may set an indicator to indicate that the system has booted from an untrusted image and booting the image.

14 Claims, 5 Drawing Sheets

100

INDICATING WHETHER A SYSTEM HAS BOOTED UP FROM AN UNTRUSTED IMAGE

RELATED APPLICATION

This application claims priority to U.S. provisional patent application 61/612,187, filed on Mar. 16, 2012, "INDICATING WHETHER A SYSTEM HAS BOOTED UP FROM AN UNTRUSTED IMAGE," the entire contents of which are herein incorporated by reference in its entirety.

FIELD

The present disclosure generally relates to the computing devices and, in particular, an operating images for the computing devices.

BACKGROUND

Computing devices generally operate using a combination of firmware and software that is configured to execute on the hardware of a given computing device. A given set of firmware and software (e.g., the operating system) that is used to operate a computing device may be referred to as an operating image for the computing device.

A computing device may come with a trusted operating image (e.g., an image that is signed and may be verified with a key) that was installed onto the computing device in the factory or updated using a trusted image source. However, computing device users may also wish to load and boot images that are not verified or not trusted (e.g., unsigned or self-signed images). For example, a user may wish to customize and make changes to the operating system for the computing device or the user may wish to install a different operating system in addition to or to replace the existing operating system.

SUMMARY

Aspects of the subject technology relate to a computing device for indicating that a system has booted an untrusted image. The computing device may include one or more processors, an indicator, and a machine-readable medium including instructions stored therein. The instructions, when executed by the one or more processors, cause the processors to perform operations including receiving instructions to boot from an image and determining whether the image to be booted up is untrusted. The operations may also include, setting, if the image is untrusted, the indicator to indicate that the computing device has booted an untrusted image and booting the image.

Aspects of the subject technology also relate to a method for indicating that a system has booted an untrusted image. The method may include receiving instructions to boot up an image and determining whether the image to be booted up is untrusted. The method may further include setting an indicator comprising is a Write-Once, Read-Many (WORM) memory device if the image is untrusted and booting the image.

Aspects of the subject technology also relate to a machine-readable medium including instructions stored therein, which when executed by a machine, cause the machine to perform operations for indicating that a system has booted an untrusted image. The operations may include receiving instructions to boot from an image, determining that the image to be booted up is untrusted, permanently setting the indicator to indicate that the computing device has booted an untrusted image, and booting the image after setting the indicator.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

Figure 1:
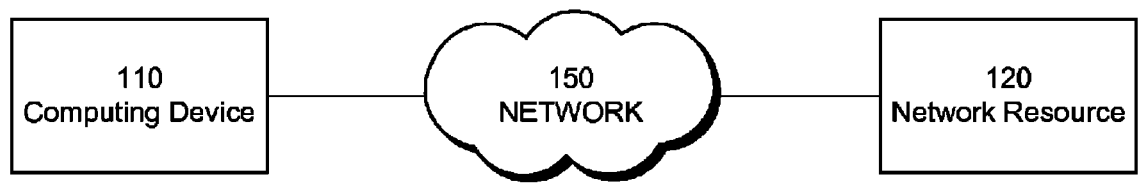
FIG. 1 shows an example of a network environment which may provide various resources to a computing device, in accordance with one aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Computing devices usually come with operating images that are trusted by an authenticating entity (e.g., a manufacturer, a purchaser, a corporate environment, a governmental entity, etc.) or authenticating process (e.g., a program or application). However, the computing devices may also be loaded with and operate using untrusted images. Untrusted images are operating images that have not been or cannot be authenticated or verified by an authenticating entity or process. For example, an untrusted image may be an image provided by an untrusted source.

When a computing device boots up from an untrusted image (e.g., an image from an untrusted source), the untrusted image may, intentionally or unintentionally, alter portions of a trusted image (e.g., a trusted operating system or firmware) that damages the trusted image or creates security vulnerabilities in the trusted image that may be difficult to detect. These security vulnerabilities may include vulnerabilities in the computing device itself or in one or more networks communicatively connected to the computing device. Although these untrusted images may alter or damage portions of the trusted image in ways that may harm the computing device or the user, it may be desirable to allow an untrusted image to be booted up on the computing device. For example, the user may wish to boot up a customized or third-party untrusted image.

Accordingly, it may be useful to determine whether a computing device has ever booted up from an untrusted image. If a computing device has not booted up from an untrusted image, it may be assumed that the integrity of the trusted operating image is still intact and the computing device may be allowed to access all abilities and resources available to it. If, on the other hand, the computing device has booted from an untrusted image, the integrity of the computing device may be uncertain. In light of the uncertainty, in some cases, one or more abilities or resources may be restricted from use by the computing device.

In accordance with various aspects of the subject technology, methods and systems for indicating whether a computing device has ever booted an untrusted image are provided. The computing device may include firmware with instructions that are configured to boot an operating image. Before booting the operating image, however, the instructions may direct the computing device to determine whether the operating image is trusted or untrusted by, for example, verifying a digital signature associated with the image.

If the image is untrusted, before booting from the untrusted image, the computing device may set an indicator to indicate that the computing device is booting from an untrusted image. According to one aspect, the indicator may be implemented in hardware as a tamper-proof memory that is written to once, permanently, and cannot be rewritten. For example, the tamper-proof memory may be embodied as a "Write Once, Read Many" (WORM) memory device, a microfuse on a processor (e.g., a CPU), a programmable read-only memory (PROM), or other hardware device (e.g., trusted platform module (TPM) chip) that may be permanently written to or burned. Once the indicator is set to indicate that the untrusted image is being booted, the boot process for the untrusted image may continue.

Applications, both on the computing device or operating remotely, may be able to determine whether or not the computing device has booted up from an untrusted image by accessing the indicator and determining whether it has been set to indicate that an untrusted image has been booted from the machine. If the indicator indicates that an untrusted image has been booted on the computing device, an application on the computing device or operating remotely may restrict processes on the computing device by limiting computing device functionality or access to various resources. For example, a server that controls access to a private network (e.g., a corporate or government network) may prevent or limit access to the computing device based on the indicator indicating that an untrusted image has been booted on the computing device.

For example, FIG. 1 shows an example of a network environment 100 which may provide various resources to a computing device 110, in accordance with one aspect of the subject technology. The network environment 100 may provide a network resource 120 to the computing device 110 through a network 150 such as the internet. The network resource 120 may be, for example, data stored on a server or access to a private network such as an internal network for a corporation or a governmental entity.

For various reasons, such as those described above (e.g., to maintain network security or to ensure authorized access to the resource), it may be desirable to determine that the computing device 110 attempting to access the network resource 120 has not booted from an untrusted image. To address this concern, various aspects of the subject technology may provide systems and methods for a process or an entity (e.g., an authentication server) controlling access to the network resource 120 to determine whether or not the computing device 110 has booted from an untrusted image.

According to one aspect, when the computing device 110 attempts to access the network resource 120, the computing device 110 may determine whether the computing device 110 has ever booted from an untrusted image by inspecting the status of an indicator. The computing device 110 may then communicate the status of the indicator to the process or entity controlling access to the network resource 120 (e.g., an authentication server). The status of the indicator may be communicated directly to the process or entity or as a digitally signed value indicating the status of the indicator. Based on the status of the indicator, the process or entity controlling access to the network resource 120 may grant or deny access to the network resource 120.

Although FIG. 1 shows network resources 120 that may be provided to a computing device 110, other resources or capabilities may also be provided or denied to a computing device based on whether or not the computing device has ever booted from an untrusted image. For example, the resources that may be provided to the computing device may be located on the computing device 110 itself.

Figure 2:
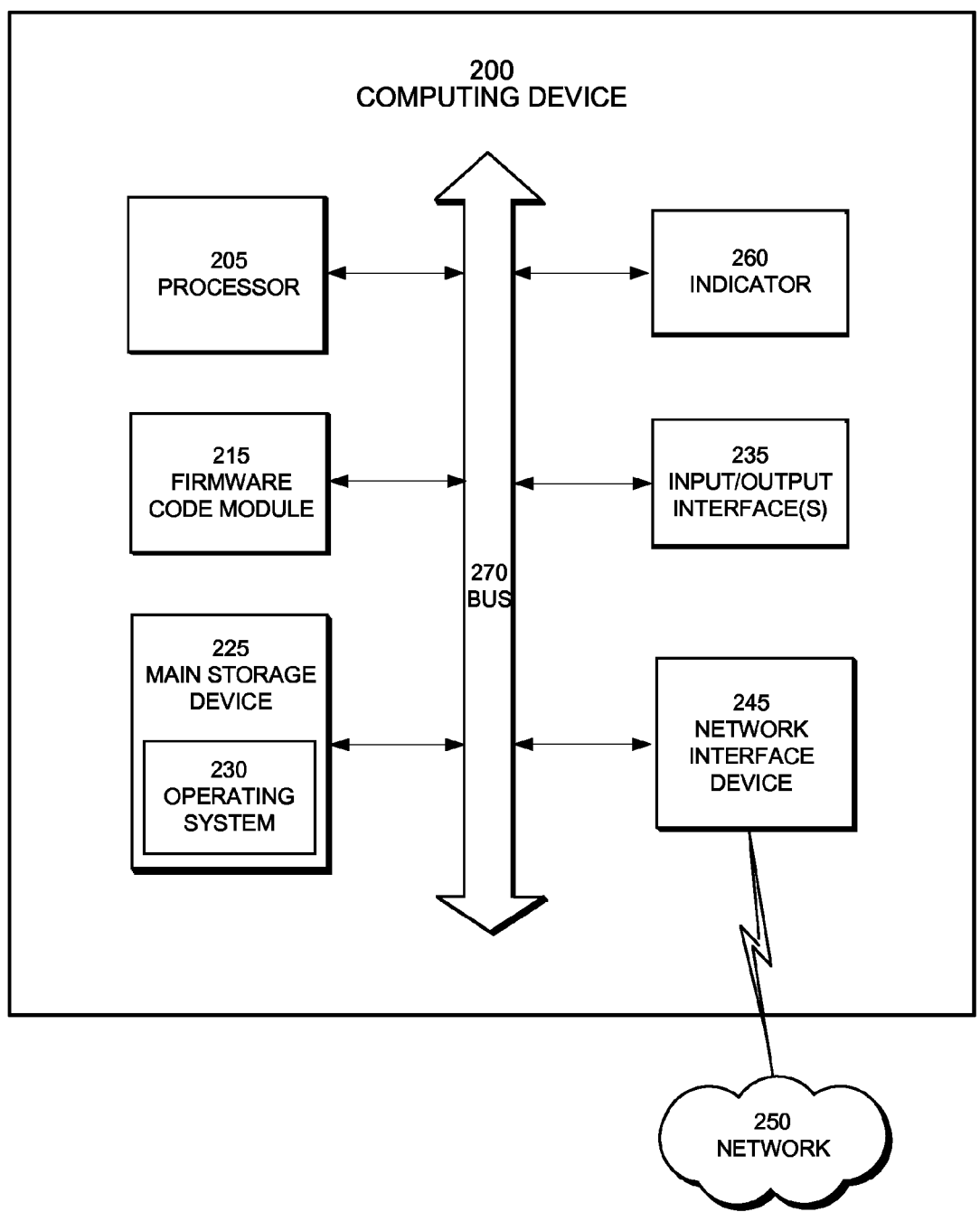
FIG. 2 is a block diagram illustrating a computing device 200, in accordance with various aspects of the subject technology.

FIG. 2 is a block diagram illustrating a computing device 200, in accordance with various aspects of the subject technology. The computing device 200 may be a desktop computer, a laptop, a netbook, a tablet, a smart phone, a mobile device, a server, or another type of computing device. While the computing device 200 is shown in one configuration in FIG. 2, it is to be understood that the computing device 200 may include additional, alternative, and/or fewer components.

In the example shown in FIG. 2, the computing device 200 may include a processor 205, a firmware code module 215, a main storage device 225, one or more input/output interfaces 235, a network interface device 245, and an indicator 260 which may communicate with one another via a bus 270. The bus 270 collectively represents all system, peripheral, and chipset buses that communicatively connect the numerous components of the computing device 200.

The one or more input/output interfaces 235 may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker). One or more input/output interfaces 235 may also be configured to communicate with an external storage device 235. For example, the external storage device may be a removable data storage device such as a universal serial bus (USB) drive or a secure digital (SD) card, and an interface 235 may be, respectively, a USB data port or a SD card reader.

The processor 205 may be configured to control the various elements of the computing device 200 and perform various tasks by executing machine-readable instructions that are stored in the main storage device 225, the firmware code module 215, or any other machine-readable medium (e.g., an external or secondary storage device). The main storage device 225 may include cache memory, random access memory, or one or more hard drives. The main memory device may contain a root file system that includes an instance of an operating system 230 for the computing device 200. The processor 205 may be implemented as a single processor, a multi-core processor, or multiple processors depending on the implementation.

The firmware code module 215 may be a non-transitory machine-readable medium that includes instructions that may be executed by the processor 205 or other processors when booting the computing device 200. The instructions stored in the firmware code module 215 (e.g., the boot stub) may direct the processor 205 to initiate the computing device 200 and begin booting up from a particular image.

The network interface device 245 may be configured to enable the system 200 to communicate with other computing devices or servers via a network 250. For example, the system 200 may use the network interface device 245 to access network resources or data needed to perform one or more applications. According to one aspect, before granting access to network resources or transmitting data to the system 200, entities (e.g., authentication servers) controlling access to the network resources may first perform one or more validation procedures. One validation procedure may be to check an indicator 260 on the system 200 to determine whether the system 200 has booted from an untrusted operating image.

The indicator 260 may be a "Write Once, Read Many" (WORM) memory device (e.g., a write-once register). According to one aspect, the indicator may be a tamper-proof memory that is written to once, permanently, and cannot be rewritten. The indicator may be implemented in hardware as a microfuse on a processor, a programmable read-only memory (PROM), or a trusted platform module (TPM) chip that may be permanently written to or burned.

The indicator may be configured to securely store an indication of whether or not the computing device 200 has ever booted up from an untrusted image. During initialization of the computing device 200, the computing device 200 may detect that the operating image to be booted up is untrusted. Accordingly, in one aspect, the computing device 200 may set the indicator 260 to indicate that an untrusted image is to be booted up before booting up from the untrusted image.

Figure 3:
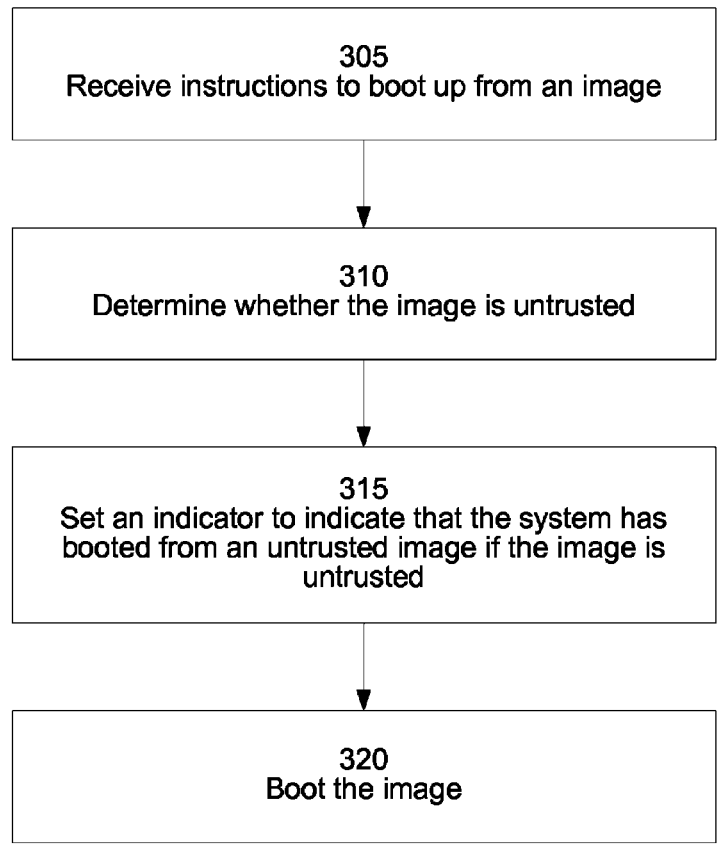
FIG. 3 is a flow chart illustrating a process for indicating whether a computing device has booted up using an untrusted image, in accordance to one aspect of the subject technology.

FIG. 3 is a flow chart illustrating a process 300 for indicating whether a computing device has booted up using an untrusted image, in accordance to one aspect of the subject technology. Although the steps in FIG. 3 are discussed with respect to the computing device 200 in FIG. 2, the steps are not limited to the components of the computing device 200. Furthermore, although the steps are shown in one particular order, other orderings of steps are also possible.

At step 305, the computing device 200 may receive instructions to boot up from an image. For example, in response to a user turning on or restarting the computing device 200, the computing device 200 may execute an initialization sequence. The initialization sequence may include instructions (e.g., instructions on a writable portion of the firmware) that specify which image to be booted up.

At step 310, a determination is made whether the image to be booted up is a trusted image or an untrusted image. The determination as to whether or not the image to be booted up is trusted may be done in any number of ways such as the use of passwords, public or private key encryption, digital certificates, or a combination of methods.

According to one aspect, the determination may be made based on a digital signature associated with the image. For example, a distributor of the image (e.g., the manufacturer of the computing device 200, the seller of the computing device 200, an entity controlling access to a resource, etc.) may generate a message digest by hashing the image or a portion of the image, generate the digital signature by encrypting the message digest with a private key, and append the digital signature to the image. After the digital signature is associated with the image, the image may be provided to the computing device 200 (e.g., the image may be loaded onto the computing device 200 before the user obtains the computing device 200 or the image may be transferred to the computing device 200 via network or machine-readable medium after the user has obtained the computing device 200).

When the computing device 200 receives instructions to boot up from the image, the computing device 200 may first decrypt the digital signature using a public key to change the digital signature back into a first message digest. A second message digest may be generated by hashing the image or a portion of the image. If the first message digest and the second message digest match, then the image may be considered trusted (e.g., authenticated, validated, or from a trusted source). If the message digests do not match or if there is a problem is encountered in validating the image (e.g., the image is not associated with a digital signature), the image may be considered untrusted (e.g., not from a trusted source).

If the image to be booted is trusted, the computing device 200 may jump to step 320 and boot the image. If, however, the image to be booted is untrusted, the computing device 200 may set an indicator 260 to a state that indicates that the system has booted from an untrusted image at step 315. After the indication 260 is set, the computing device 200 may boot the image at step 320.

As discussed above, the indication 260 may be a memory device on the computing device 200 that may be written to only once. If the computing device 200 sets the indicator 260 to indicate that the computing device 200 has booted up from an untrusted image, the indicator 260 may be unable to be rewritten without replacing the indicator 260 hardware or a component of the indicator 260 altogether. According to one aspect, the indicator 260 may be a write-once register, a microfuse on a processor, a programmable read-only memory, or a TPM chip configured to securely store the indication in a lockable memory space.

The indicator 260 may be used to determine whether a computing device 200 should have access to one or more resources and capabilities. For example, if the indicator 260 has not been set to indicate that the computing device 200 has booted from an untrusted image, the various resources or capabilities may be provided to the computing device 200. On the other hand, if the indicator 260 has set to indicate that the computing device 200 has booted an untrusted image, regardless of whether the computing device 200 is currently running a trusted or untrusted image, certain resources or capabilities may be denied to the computing device 200.

Figure 4:
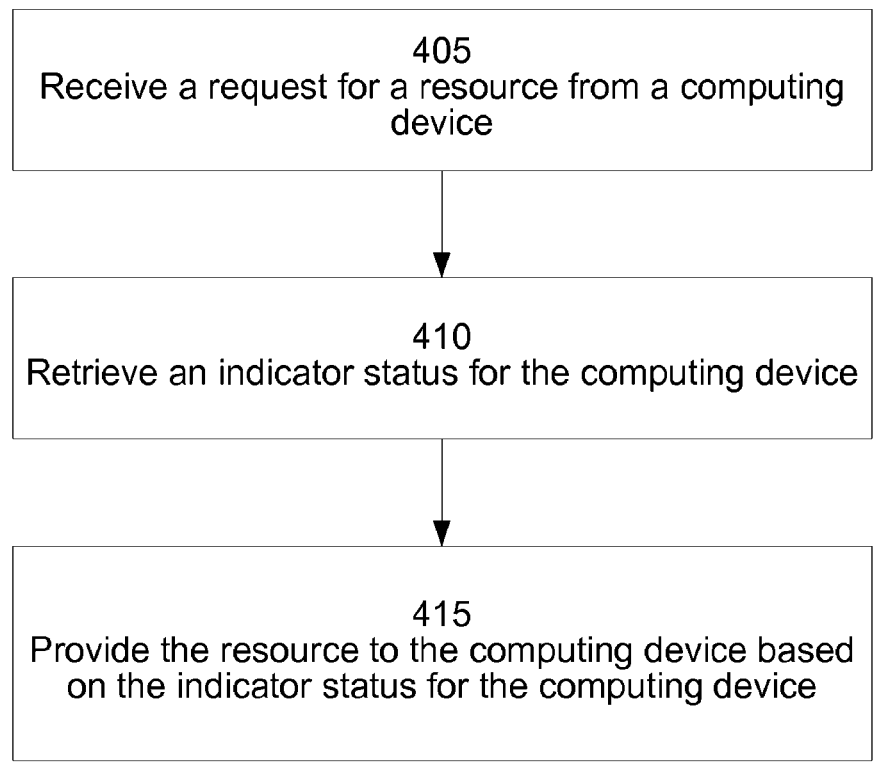
FIG. 4 is a flow chart illustrating a process for providing resources to a computing device based on the indicator status of the computing device, in accordance to one aspect of the subject technology.

FIG. 4 is a flow chart illustrating a process 400 for providing resources to a computing device based on the indicator status of the computing device 200, in accordance to one aspect of the subject technology. Although the steps are shown in one particular order, other orderings of steps are also possible.

At step 405, an entity controlling access to a resource, such as an authentication server, receives a request for the resource from a computing device 200. In order to grant the computing device 200 access to the resource, the entity may require that the computing device 200 never have booted up from an untrusted image. Accordingly, at step 410, the entity may retrieve an indicator status indicating for the computing device 200.

At step 415, the entity may provide the resource to the computing device 200 based on the indicator status for the computing device 200. For example, if the state of the indicator indicates that the computing device 200 has not booted up from an untrusted image, the entity may provide the computing device 200 with access to the resource. On the other hand, if the state of the indicator indicates that, at some point in the past, the computing device 200 has booted up from an untrusted image, the entity may deny or limit access to the resource.

According to one aspect of the subject technology, the entity controlling access to a resource may also be located on the computing device 200 itself. For example, the entity may be a portion of the operating system or an application (e.g., a process) running on the computing device 200.

Figure 5:
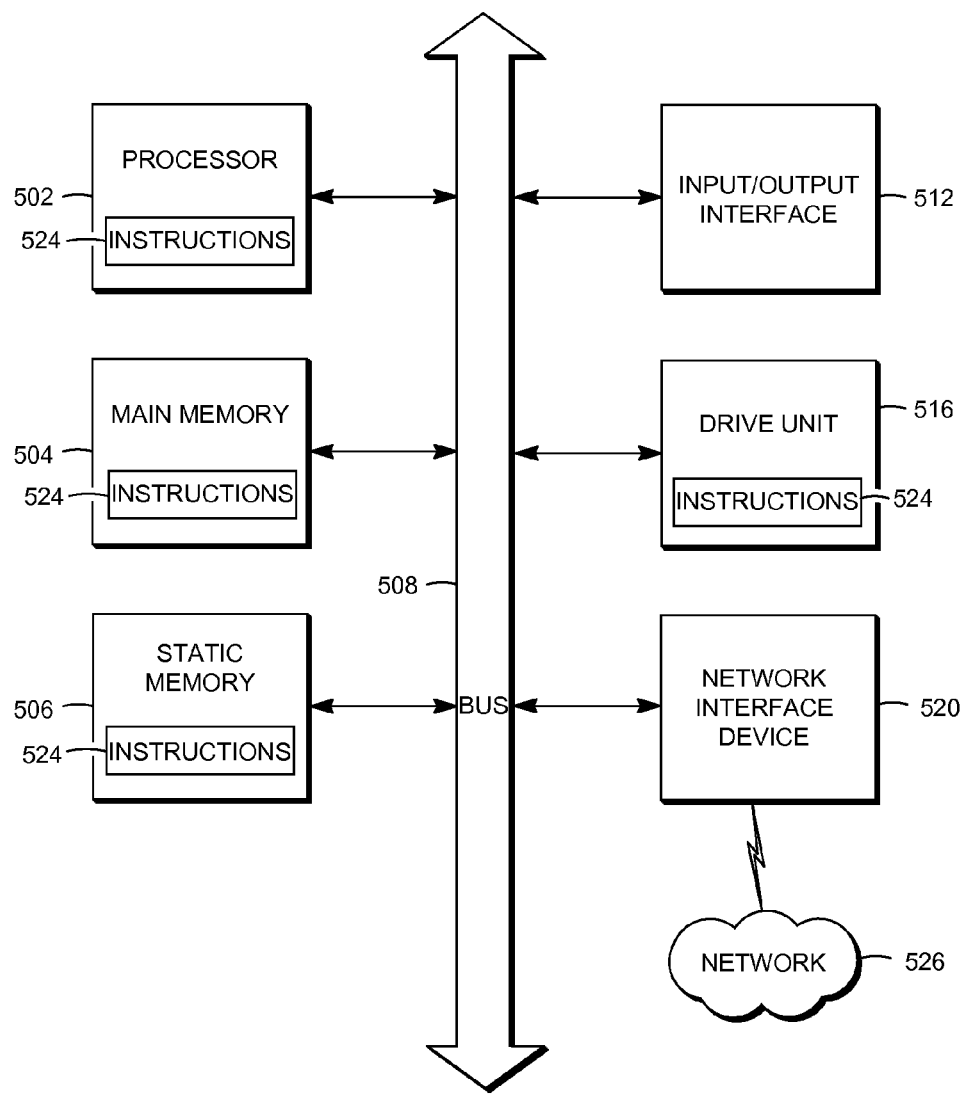
FIG. 5 is a block diagram illustrating a computing device with which any of the aspects described herein may be implemented.

FIG. 5 is a block diagram illustrating a computing device 500 with which any of the aspects described herein may be implemented. In certain aspects, the computing device 500 may be implemented using hardware or a combination of software and hardware, either in a dedicated server, or integrated into another entity, or distributed across multiple entities.

The example computing device 500 includes a processor 502, a main memory 504, a static memory 506, a disk drive unit 516, and a network interface device 520 which communicate with each other via a bus 508. The computing device 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computing device 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the aspects discussed herein. The term "machine-readable medium" shall accordingly be taken to include, but not be limited to, storage mediums such as solid-state memories, optical media, and magnetic media.

Systems, methods, and machine-readable media for indicating that a system has booted an untrusted image are provided. The system may be configured to receive instructions to boot up an image and determine whether the image to be booted up is untrusted. If the image is untrusted, the system may permanently set an indicator to indicate that the system has booted from an untrusted image and booting the image.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for indicating that a computing device has booted an untrusted image, the method comprising:
   receiving, via a network, an image from a source external to the computing device;
   receiving instructions, to boot up the image;
   determining whether the source external to the computing device is a trusted source, wherein determining comprises the steps of:
      retrieving a digital signature appended to the image,
      decrypting the digital signature using a cryptographic key, and
      comparing the decrypted digital signature with a message digest computed based on the image;
   permanently setting, if the image is not from a trusted source, an indicator to indicate that the computing device has booted from an untrusted image, the indicator implemented as a trusted platform module (TPM) chip configured to be permanently written to once, such that the indicator cannot be rewritten;
   booting the image;
   sending a request for accessing at least one resource;
   receiving, from an entity controlling access to the at least one resource, a request for an indicator status; and
   providing the entity with the indicator status, wherein the entity is configured to restrict access to the at least one resource if the indicator status indicates that an untrusted image has been booted by the computing device.

2. The computer-implemented method of claim 1, wherein the indicator is located on a processor of the TPM chip.

3. The computer-implemented method of claim 1, wherein the indicator comprises a microfuse.

4. The computer-implemented method of claim 3, wherein setting the indicator comprises burning the microfuse.

5. The computer-implemented method of claim 1, wherein setting the indicator comprises permanently burning the TPM chip to a state indicating that the computing device has booted an untrusted image.

6. The computer-implemented method of claim 1, wherein the indicator comprises a Write Once, Read-Many (WORM) memory device.

7. A computing device comprising:
   one or more processors;
   a trusted platform module (TPM) chip configured to be permanently written to and comprising an indicator; and
   a machine-readable medium comprising instructions stored therein, which when executed by the one or more processors, cause the processors to perform operations comprising:
      receiving, via a network, an image from a source external to the computing device;
      receiving instructions to boot from the image;
      determining whether the source external to the computing device is an untrusted source, wherein determining comprises the steps of:
         retrieving a digital signature appended to the image,
         decrypting the digital signature using a cryptographic key, and
         comparing the decrypted digital signature with a message digest computed based on the image;
      permanently setting, if the image is from an untrusted source, the indicator to indicate that the computing device has booted an untrusted image, the indicator configured to be permanently written to once, such that the indicator cannot be rewritten;
      booting the image;
      sending a request for accessing at least one resource;
      receiving, from a process controlling access to the at least one resource, a request for an indicator status; and
      providing the process with the indicator status, wherein the process is configured to restrict access to the at least one resource if the indicator status indicates that an untrusted image has been booted by the computing device.

8. The computing device of claim 7, wherein the indicator is a Write-Once, Read-Many (WORM) memory device.

9. The computing device of claim 8, wherein the WORM memory device is a microfuse.

10. The computing device of claim 9, wherein setting the indicator comprises burning the microfuse.

11. The computing device of claim 7, wherein the indicator is located on a processor of the TPM chip.

12. The computing device of claim 7, wherein setting the indicator comprises permanently burning the TPM chip to a state indicating that the system has booted an untrusted image.

13. The computing device of claim 7, wherein the indicator comprises a lockable memory space of the TPM.

14. A non-transitory machine-readable medium comprising instructions stored therein, which when executed by a machine, cause the machine to perform operations comprising:
   receiving, via a network, an image from a source external to the machine;
   receiving instructions to boot from the image;
   determining that the source external to the machine is untrusted, wherein determining comprises the steps of:
      retrieving a digital signature appended to the image,
      decrypting the digital signature using a cryptographic key, and
      determining that the decrypted digital signature and a message digest computed based on the image do not match;
   permanently setting an indicator implemented as a trusted platform module (TPM) chip to indicate that the machine has booted an untrusted image by permanently writing the TPM chip to a state indicating that the machine has booted the untrusted image, the indicator configured to be permanently written to once, such that the indicator cannot be rewritten;
   booting the image after setting the indicator;
   sending a request for accessing at least one resource;
   receiving, from a process controlling access to the at least one resource, a request for an indicator status; and
   providing the process with the indicator status, wherein the process is configured to restrict access to the at least one resource if the indicator status indicates that an untrusted image has been booted by the machine.

\* \* \* \* \*